(12) United States Patent
Williams (10) Patent No.: US 10,913,337 B1
(45) Date of Patent: Feb. 9, 2021

(54) TARP HOLD-DOWN

(71) Applicant: Shea O'Neal Williams, Marion, AR (US)

(72) Inventor: Shea O'Neal Williams, Marion, AR (US)

( * ) Notice: Subject to any disclaimer, the term of this patent is extended or adjusted under 35 U.S.C. 154(b) by 0 days.

(21) Appl. No.: 17/007,062

(22) Filed: Aug. 31, 2020

Related U.S. Application Data (60) Provisional application No. 63/044,429, filed on Jun. 26, 2020.

(51) Int. Cl.
  *B60J 7/185* (2006.01)
  *B60J 7/08* (2006.01)

(52) U.S. Cl.
  CPC .............. *B60J 7/185* (2013.01); *B60J 7/085* (2013.01)

(58) Field of Classification Search
  CPC .................................. B60J 7/085; B60J 7/185
  USPC .................. 296/98, 100.16, 100.18
  See application file for complete search history.

(56) References Cited

U.S. PATENT DOCUMENTS

| | | | |
|---|---|---|---|
| 6,474,719 B2 | 11/2002 | Henning | |
| 6,575,518 B1 | 6/2003 | Henning | |
| 10,612,278 B2* | 4/2020 | Ben Abdelaziz | ....... E05B 77/54 |
| 2007/0222253 A1* | 9/2007 | Wood, Jr. | ................ B60J 7/085 |
| | | | 296/98 |
| 2008/0136211 A1* | 6/2008 | Gomes | .................... B60J 7/085 |
| | | | 296/98 |
| 2012/0187712 A1* | 7/2012 | Bromberek | ............ B60J 7/085 |
| | | | 296/98 |
| 2013/0009421 A1 | 1/2013 | Reeder et al. | |
| 2013/0175822 A1* | 7/2013 | Eggers | ..................... B60J 7/085 |
| | | | 296/98 |
| 2014/0217768 A1 | 8/2014 | Barley | |
| 2018/0147923 A1* | 5/2018 | Liu | .......................... B60J 7/085 |
| 2019/0217691 A1* | 7/2019 | Eggers | ..................... B60J 7/085 |

* cited by examiner

*Primary Examiner* — Jason S Morrow
(74) *Attorney, Agent, or Firm* — McClure, Qualey & Rodack, LLP (57) ABSTRACT

In one embodiment, a system, comprising: a control system; a pivot arm assembly, the pivot arm assembly comprising plural arms joined by a transverse arm; and plural electromagnetic assemblies, each comprising an electromagnetic device, wherein the control system is configured to selectively activate each electromagnetic device when the plural arms are in contact with the plural electromagnetic assemblies to magnetically constrain movement of the plural arms relative to the plural electromagnetic assemblies.

19 Claims, 10 Drawing Sheets

| holding value @ 0" gap | width | length | height | mounting thread | thread depth | watts | amps | net weight |
|---|---|---|---|---|---|---|---|---|
| | A | B | C | D | E | | | |
| 300 lbs. | 3.308" | 3.308" | 1-1/2" | 5/16"-18 | 1/2" | 14 | 1.2 | 2 lbs. |

TARP HOLD-DOWN

CROSS REFERENCE TO RELATED APPLICATION

This application claims the benefit of U.S. Provisional Application No. 63/044,429, filed Jun. 26, 2020, which is hereby incorporated by reference in its entirety.

TECHNICAL FIELD

The present disclosure is generally related to tarping systems for tractor trailers, and in particular, front-to-back tarping systems for open-topped trailers.

BACKGROUND

An open-topped trailer may be used for hauling a variety of material, including lumber, gravel, aggregate, etc. To prevent the loss or damage of material during transport, a tarp (tarpaulin) system is employed. One popular type of tarp system is the front-to-back (FTB) tarp system. The FTB tarp system typically comprises a spring-loaded, pivot arm assembly, a tarp, and a motor assembly comprising a motor and a roll bar to which the tarp is coupled and wound about when the trailer is in an uncovered configuration. The pivot arm assembly comprises a pair of spring-loaded arms that pivotably move along and adjacent to an outside surface of upright sidewalls of the trailer. The pivot location at each side of the trailer is achieved via a respective pivot mount housing one or more springs and centrally located on a lower portion of the respective sidewall. The pivot arm assembly further comprises a transverse arm connecting the pair of arms and also coupled to the tarp. The pivot arms and transverse arm are generally comprised of a soft metal, such as aluminum. The pivot arm assembly is arranged in a generally inverted-U shaped configuration over the trailer.

The tarp is attached to the transverse arm, and is unfurled from the motor assembly when it is desired to cover the top of the trailer, and then returned to its furled state in the motor assembly when it is desired to expose the bed of the trailer for loading or unloading of material. To cover a top of the trailer, an operator activates the motor of the motor assembly that is located proximal to the front (tractor or driver-side) of the trailer. The motor in turn causes rotation of the coupled (e.g., direct to the shaft, or via a gearing assembly) roll bar and facilitates the unfurling (e.g., unwinding) of the tarp (which is coupled to the transverse bar) longitudinally across the trailer, the rearward movement of the pivot arm assembly and the tarp largely influenced by the spring forces that bias the pivot arms rearward. To retract the tarp, the operator again activates the motor, which in turn causes rotation of the roll bar, which draws or pulls the tarp (and hence, the coupled transverse arm) against the spring forces of the pivot arms until the tarp is retracted and furled up at the motor assembly.

The springs of each pivot mount are largely used to draw the tarp longitudinally over the top of the trailer, and generally provide a force on each side of about fifty (50) to sixty (60) pounds of pressure to the pivot arms. The tarp itself generally sags into the bed of the trailer, lying on the material with minimal or no tension on the tarp. When the trailer is in motion (drawn by a coupled or chassis-integrated tractor being driven along a roadway), and particularly when hauled at higher speeds (e.g., approximately 55 miles per hour, MPH), wind can pass underneath the tarp and cause the tarp to flap and expose the material in the bed of the trailer, raising the risk of material spillage onto the roadway. Further, this flapping action of the tarp may result in the pivot arm assembly being repeatedly lifted up and slammed down. Since the pivot arms are typically constructed of a soft metal, such action caused by the wind getting beneath the tarp may damage (e.g., bend) the pivot arms and/or tear the tarp.

Some mechanisms have been introduced to mitigate the effects of the wind getting underneath the tarp during travel. For instance, one mechanism includes a post and hook assembly, where posts projecting laterally outward from upper and rearward-located sidewalls of the trailer serve as connection points for the rearward-disposed hooks located adjacent the advancing end of the tarp in an attempt to secure the position of the tarp. In some cases, one or more locations of the tarp may be manually tied down to the trailer using a strap or chain and ratchet mechanism.

SUMMARY OF THE INVENTION

In one embodiment, a system, comprising: a control system; a pivot arm assembly, the pivot arm assembly comprising plural arms joined by a transverse arm; and plural electromagnetic assemblies, each comprising an electromagnetic device, wherein the control system is configured to selectively activate each electromagnetic device when the plural arms are in contact with the plural electromagnetic assemblies to magnetically constrain movement of the plural arms relative to the plural electromagnetic assemblies.

These and other aspects of the invention will be apparent from and elucidated with reference to the embodiment(s) described hereinafter.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DESCRIPTION OF EXAMPLE EMBODIMENTS

Certain embodiments of a tarp hold-down system and method are disclosed that use magnetic forces to constrain a tarp in a covered position over an open-topped trailer. In one embodiment, a tarp hold-down system is used in a front-to-back (FTB) tarp system, the tarp hold-down system comprising an electromagnetic assembly mounted to each side of the trailer (e.g., trailer frame or chassis of the trailer) and a pivot arm assembly that is coupled to a tarp, whereby at full deployment of the tarp over the trailer, the pivot arms of the pivot arm assembly contact the electromagnetic assemblies that are energized to securely hold down the pivot arm assembly, using magnetic force, to the electromagnetic assembly. The tarp hold-down system provides an elegant, low-cost design that constrains the tarp in a covered position or configuration regardless of the travel speed or wind conditions, which may preserve the longevity of the pivot arm assembly and/or the tarp, and help to prevent the spillage of material onto a roadway.

Digressing briefly, some tarp systems have been introduced to alleviate the effects of the passage of wind underneath a tarp during travel. For instance, one system mentioned above uses a hook and post assembly, which appears to address the problem using a mechanical solution. However, along with a mechanical solution is often the requirement for correct tolerances and a proper connection among the additional parts, which over time, may lead to misalignment due in part to wear, and/or noise from loosened parts or connections, etc. Other mechanisms include the use of one or more straps or chains that are used to tie down or ratchet the tarp and/or arms to the trailer. However, such a solution is at odds with what some perceive as a benefit to an electrical-based, FTB tarp system, namely the reduced human intervention, which is intended to eliminate the need for a driver or operator to leave the cab to tighten down the tarp and/or the arms. Further, in some environments, leaving the cab to manually secure the tarp and/or the arms may present a risk of injury to the driver/operator, or even be prohibitive according to company policy or insurance policies. In contrast, certain embodiments of the tarp hold-down system disclosed herein use an elegant, relatively low-cost design that does not require the operator to leave the cab of the tractor to tie down or ratchet down the tarp or arms manually, providing a user-safe, industry-accepted solution to tarp securement.

Having summarized certain features of a tarp hold-down system, reference will now be made in detail to the description of certain embodiments of a tarp hold-down system as illustrated in the drawings. While the tarp hold-down system will be described in connection with these drawings, there is no intent to limit it to the embodiment or embodiments disclosed herein. For instance, though emphasis is on electrical FTB tarp systems, certain embodiments of a tarp hold-down system may be beneficially applied to systems where the tarp is pulled to a covered position manually, whereby electromagnetic devices are activated to secure the tarp, or generally to non-FTB systems that may nevertheless benefit from securement of the tarp. In some embodiments, tarp systems based on hydraulics and/or other mechanisms than those disclosed herein (e.g., rack-and-pinion) may also benefit from the capabilities of certain embodiments of a tarp hold-down system, enabling, for instance, smaller pressures, smaller sized equipment, and/or improved hold down forces. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the invention as defined by the appended claims. Further, it should be appreciated in the context of the present disclosure that the claims are not necessarily limited to the particular embodiments set out in the description.

Figure 1A:
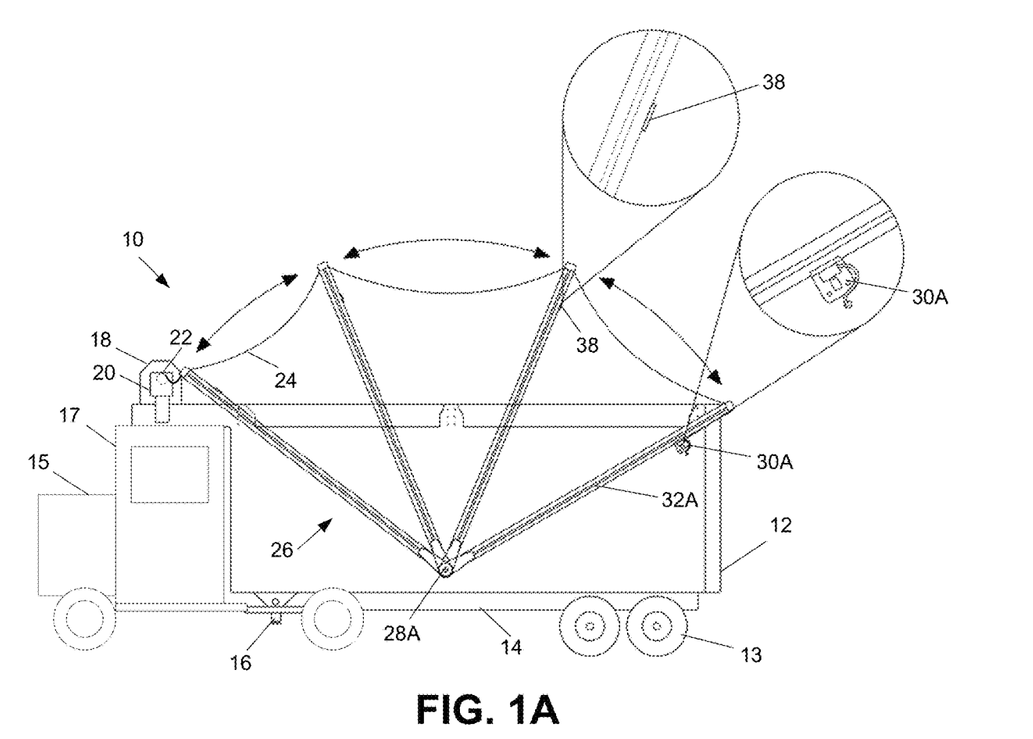
FIG. 1A is a schematic diagram that illustrates an embodiment of an example tarp hold-down system.

Referring now to FIG. 1A, shown is a schematic diagram that illustrates an embodiment of an example tarp hold-down system 10. In one embodiment, the tarp hold-down system 10 comprises a trailer 12 having a chassis 14 to which plural wheels 13 are attached, and a hitch assembly 16 for coupling to a tractor 15. As is known, the tractor 15 typically comprises an engine, drive system, and a passenger cab 17. The tarp hold-down system 10 further comprises a motor assembly 18 mounted, in one embodiment, to (or proximal to) a front, top location of the trailer 12. The motor assembly 18 comprises a motor 20 operably coupled to a roll bar 22 (both representatively shown in cutaway or phantom view) that extends transversely (side-to-side) within the motor assembly 18. In one embodiment, the motor assembly 18 may comprise an enclosure with at least a rearward facing opening for permitting ingress and egress of a tarp that is coupled (e.g., bolted, adhered, screwed, etc.) to, and furled to (e.g., wound about), the roll bar 22. The roll bar 22 rotates clockwise and counter-clockwise based on motor rotation, depending on whether the tarp is to be deployed or returned to the motor assembly 18.

Figure 1B:
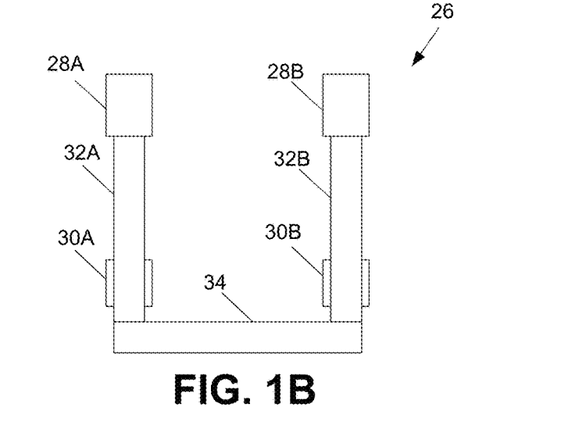
FIG. 1B is a schematic diagram that illustrates, in partial overhead, isolated plan view, an embodiment of a pivot arm assembly.

Referring to FIGS. 1A-1B, the tarp hold-down system 10 further comprises a tarp 24, and a pivot arm assembly 26 that includes respective pivot mounts 28 (28A, 28B). The tarp hold-down system 10 further comprises a respective electromagnetic assembly 30 (30A, 30B) located on an upper and rearward portion of the sidewalls of the trailer 12. In one embodiment, the pivot arm assembly 26 comprises two pivot arms 32 (32A, 32B) that each pivot about the respective pivot mount 28 (e.g., 28A, 28B) mounted to each side of the trailer 12. Though the pivot mount 28 is shown positioned on the trailer sidewall, in some embodiments, the pivot mount 28 may be positioned in a location above or lower than the depicted location. For instance, in some embodiments, each pivot mount 28A 28B may be located on the trailer chassis 14. The pivot arms 32 may each be comprised of a metal and/or plastic tubular or rectangular material (solid or hollow), and in one embodiment, are each comprised of a soft metal such as aluminum. The pivot arms 32 are positioned adjacent to, and pivot along, the outside surface of the sidewalls of the trailer 12. Each pivot arm 32 is coupled to a transverse arm 34 at a respective end opposite the pivot mount 28. In other words, pivot arm 32A is coupled on one end to pivot mount 28A and to one end of the transverse arm 34 on the opposing end, and pivot arm 32B is coupled on one end to pivot mount 28B and to the other end of the transverse arm 34 on the end opposing the pivot mount 28B end. The coupling between the pivot arms 32 and the transverse arm 34 may be achieved in one of a variety of ways. For instance, the transverse arm connecting ends of each of the pivot arms 32 may comprise an elbow (as a separate detachable coupler or formed in the pivot arms 32) that slidably receives the ends of the transverse arm 34. In some embodiments, a friction fit may be established, and/or in some embodiments, an additional securement may be included, such as via a screw connection, bolt connection, bracket that joins the separate pieces, among other known connection mechanisms. In some embodiments, the elbow may be formed or attached on each end of the transverse arm 34 and configured to receive each arm end (and in some embodiments, additionally secured, similar to the explanation above). In some embodiments, the pair of arms 32 and the transverse arm 34 may be formed as a single piece. In one embodiment, the pivot arm assembly 26 comprises the two pivot mounts 28, two pivot arms 32, and the transverse arm 34, which collectively are configured in an approximately inverted U-shape over the top and sides of the trailer 12. The transverse arm 34 is coupled to the tarp 24. In one embodiment, the tarp 24 may be releasably wrapped (e.g., using buttons, Velcro®, etc.) about the transverse arm 34. In some embodiments, the transverse arm 34 may be decoupled from the pivot arms 32, slipped through a stitched or formed pocket in the tarp 24 (e.g., when uncoupled from the pivot arms 32), and then reconnected to the pivot arms 32. In some embodiments, the tarp 24 may be bolted or screwed to the transverse arm 34, either directly or indirectly (e.g., through the use of bolts or screws or rivets inserted through metal ringlet openings formed in the end of the tarp 24). These and/or other mechanisms for attachment of the tarp 24 are contemplated to be within the scope of the embodiments.

As indicated above, the tarp hold-down system 10 comprises an electromagnetic assembly 30 (e.g., 30A, 30B) coupled to each side of the sidewalls of the trailer 12. As explained further below, each electromagnetic assembly 30 comprises a bracket assembly and an electromagnetic device, the bracket assembly coupling or affixing the electromagnetic device to the trailer 12 and the electromagnetic device providing the magnetic hold-down force for securing the tarp 24 in a covered position over the trailer 12 based on the contact between the pivot arms 32 and the electromagnetic assemblies 30. In one embodiment, the electromagnetic assembly 30 is coupled to the upper-rear portion of the respective sidewalls of the trailer 12, and is arranged to receive the pivot arms 32 when the pivot arms 32 are biased rearward to cover the top of the trailer 12 with the coupled tarp 24. In one embodiment, the pivot arms 32 each comprise a bracket 38 on one side of the pivot arm 32 that is intended to contact and rest upon the electromagnetic assembly 30 when the tarp is fully deployed over the top of the trailer 12. In one embodiment, the bracket 38 is constructed of ¼ inch thick, flat plate steel, though other dimensions may be used depending on the application. In one embodiment, the bracket 38 may be made at least in part of a ferromagnetic material to enable securement in position of the pivot arm 32 on the electromagnetic assembly 30 via a magnetic force.

In operation for one embodiment, and assuming the tarp 24 is furled up at the motor assembly 18 (e.g., the top of the trailer 12 is uncovered, exposing the bed of the trailer 12 and/or the material residing on the bed of the trailer 12), an operator sitting in the cab may sustainably suppress a button (or switch or other user interface associated with a control system) to activate the motor 20 of the motor assembly 18 (which removes power to the electromagnetic devices of the electromagnetic assemblies 30). The motor 20 rotates, which through direct coupling to the shaft of the motor 20 or indirect coupling (e.g., via a gearing assembly), causes the roll bar 22 to rotate. Since the tarp 24 is coupled (e.g., bolted, screwed, riveted, adhered, etc.) to the roll bar 22, the tarp 24 is unfurled (e.g., unwound) from the roll bar 22 based largely on the biasing force of the spring(s) in the pivot mounts 28. Note that in some embodiments, the springs may be omitted and forward and reverse pivoting movement of the pivot arms 32 is based on the force of the motor. As the pivot arms 32 pivot rearward, as represented by the various snapshots of pivot arm progression in FIG. 1A, the advancing end of the tarp 24, attached to the transverse arm 34 of the pivot arm assembly 26, is spread longitudinally and rearward across the top of the trailer 12 until it reaches the electromagnetic assemblies 30. Upon the termination of the pivoting motion of the pivot arms 32 (e.g., halted by contact with the electromagnetic assemblies 30), the operator releases the button (which in one embodiment, has been pressed by the operator during the duration up to this point to enable the full pivot arm, rearward swing), which in turn causes a control system to activate (e.g., power) the magnetic device of each electromagnetic assembly 30. Note that in some embodiments, a different control mechanism may be used to deploy the tarp 24. For instance, the operator may select a button momentarily, which may cause deployment of the tarp 24 until a sensor (e.g., Hall effect sensor, optical sensor, magnetic sensor, etc.) or limit switch detects the contact between the electromagnetic assemblies 30 and the brackets 38 of the pivot arms 32, which terminates the pivot motion and triggers the electromagnetic forces to deploy. In some embodiments, the control mechanism may utilize timers to determine when the deployment is completed. The resulting magnetic (attractive) force between the electromagnetic assemblies 30 and the bracket 38 of each pivot arm 32 causes the pivot arms 32 to remain securely in contact (via the brackets 38) with the electromagnetic assemblies 30, which in turn constrains any further pivoting movement of the pivot arms 32 regardless of outside forces imposed on the tarp 24 (e.g., wind through travel or weather conditions, etc.). In other words, throughout the duration of the magnetic force applied between the bracket 38 and the electromagnetic assembly 30, the tarp 24 is held securely down in a covered position or configuration over the top of the trailer 12.

To retract the tarp 24 from the fully deployed position from the prior example, in one embodiment, the operator again sustainably (to initiate and for the duration of the tarp retraction) presses the button (or other interface) in the cab 17, which activates the motor 20 of the motor assembly 18 to cause rotation of the roll bar 22 in an opposing direction (opposing the direction of unfurling the tarp 24) and enables the control system to deactivate power to the electromagnetic devices of the electromagnetic assemblies 30, hence releasing the magnetic forces that secured the tarp 24 in the covered position. The motor 20 is in effect rotating the roll bar 22 to cause the pivot arms 32 (which are attached to the tarp 24 via the coupled transverse arm 34) to pivot in a forward direction (represented in the various snapshots of advancement in FIG. 1A). In effect, the motor 20 draws via the roll bar 22 the tarp 24 (against the spring forces of the pivot mounts 28) back to the motor assembly 18, uncovering the top of the trailer 12 to expose the bed and/or material in the bed of the trailer 12. When the tarp 24 is fully retracted, the operator releases the button, which in turn deactivates the motor 20 and once again enables activation of the magnetic devices of the electromagnetic assemblies 30. Similar to the deployment function described above, a different control mechanism may be used for retracting the tarp 24, such as through the use of a single press or selection of a button, and the use of sensors, limit or contact switches, and/or timers to halt the retraction when the tarp 24 is furled at the motor assembly 18. In effect, the tarp hold-down system 10 enables an operator to secure the tarp 24 in a covered position or configuration, preventing or mitigating the risk of damage to the pivot arm assembly 26, the tarp 24, and/or spillage of material onto the roadway, without requiring the operator to leave the cab to tie down or ratchet down the tarp 24. The elegant design of the tarp hold-down system 10 also has no additional moving parts that can wear over time, resulting in a relatively quiet, durable mechanism for securing the tarp 24.

Note that variations to the above-described operations are contemplated and hence within the scope of the disclosure. For instance, though the trailer 12 is depicted as having a hitch assembly 16 for coupling to an independent tractor 15, in some implementations, the tractor and trailer may be integrated on a single chassis. Further, in one embodiment, the user interface used by the operator may optionally include a shut-off button or kill switch to disable the electromagnetic devices of the electromagnetic assemblies 30. For instance, when there is an expected period of non-use of the trailer 12 (e.g., based on vacation, service/maintenance, off-hours, etc.) and/or for any other reason (e.g., to preserve battery power), a shut-off button may be included and pressed to disable (e.g., cut power to) the magnetic devices of the magnetic assemblies 30. Though the user interface for activating the FTB tarp system and/or providing a shut-off function is described above as hardware components (e.g., an electromagnetic switch, including rocker switch, toggle switch, etc.), in some embodiments, the user interface may comprise a soft button, such as a software object (e.g., button icon) presented on a display screen (e.g., a computer display screen in the cab, or via an app provided on a smartphone device), or presented on a remote device (e.g., to enable activation remotely via telemetry equipment provided in the cab 17 or on a phone). In some embodiments, the user interface may be located outside of the cab 17, such as in a location between the cab 17 and the trailer 12, or along the side of the trailer 12.

Figure 2:
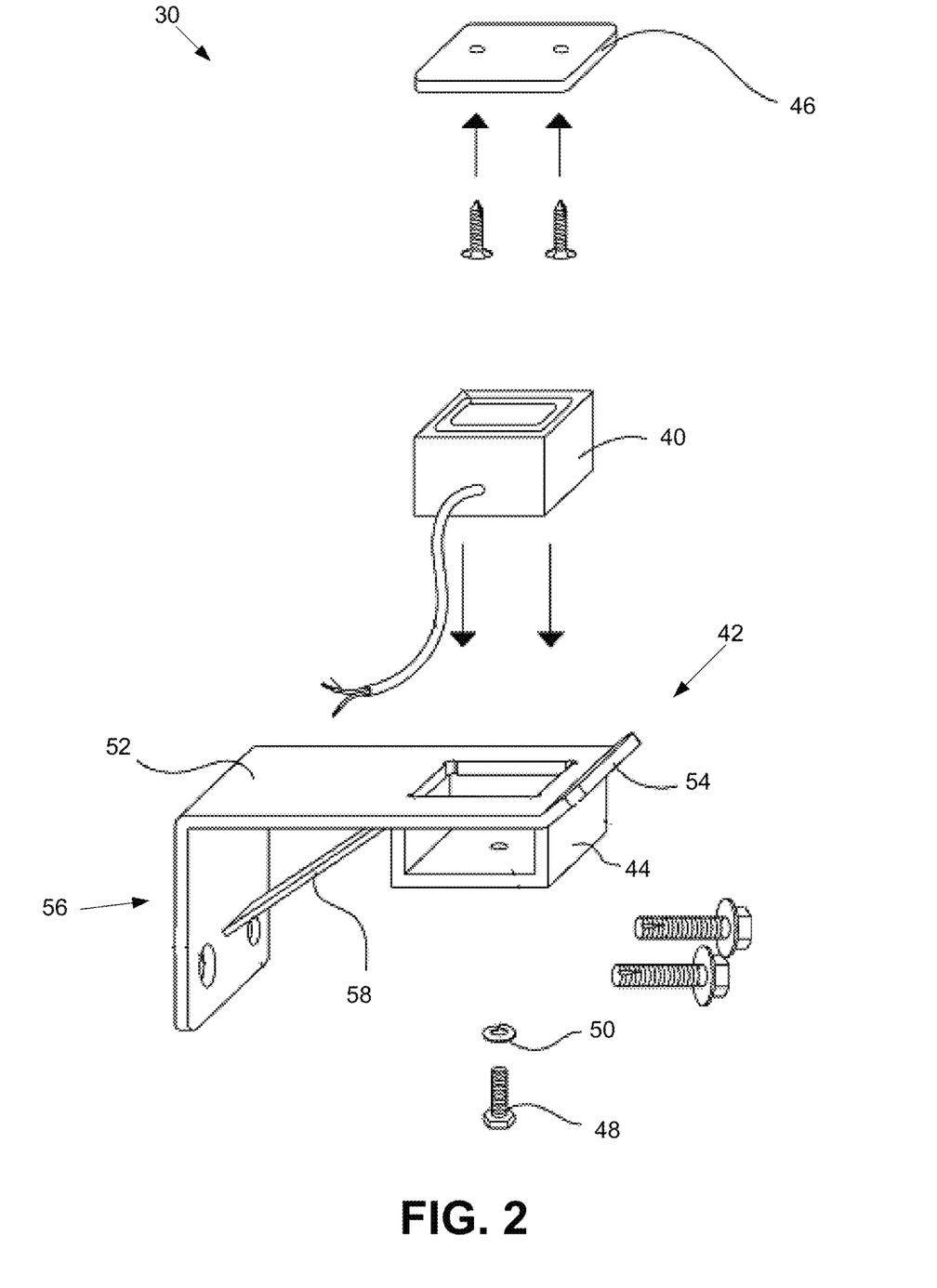
FIG. 2 is a schematic diagram that illustrates, in exploded, perspective view, an embodiment of an example electromagnetic assembly.

Having described certain aspects of the tarp hold-down system 10, attention is now directed to FIG. 2, which illustrates, in exploded, perspective view, an embodiment of an example electromagnetic assembly 30. The electromagnetic assembly 30 comprises an electromagnetic device 40 and a bracket assembly 42 to which the electromagnetic device 40 is mounted. In one embodiment, each electromagnetic device 40 comprises an electromagnetic coil that has a hold-down force of approximately 300 lbs. For instance, the electromagnetic device 40 may have physical specifications of 2½ inches in width, 2½ inches in length, and 1½ inches in height and a net weight of 2 pounds. The electromagnetic device 40 may be configured to operate under the voltage of the battery of the tractor (e.g., 12 volts), with performance specifications of 14 watts, 1.2 amperes. Note that electromagnetic devices 40 of different physical and/or performance specifications may be used depending on the application, and that the aforementioned specifications are one illustrative example. Further, in some embodiments, the electromagnetic device 40 may operate using a power source that is independent of the tractor battery.

In one embodiment, the bracket assembly 42 comprises an L-shaped configuration and is constructed in whole, or in large part, of a soft metal, including aluminum. The bracket assembly 42 may be formed at least in part from a casting operation, forming operation, or fabricated and assembled. The bracket assembly 42 comprises, in one embodiment, a cubicle-shaped housing 44, in which the electromagnetic device 40 is mounted. The electromagnetic device 40 is secured (e.g., screwed, bolted, etc.) in the housing 44 via a cover plate 46 secured (e.g., screwed, bolted, adhered) over the top of the housing 44 and further secured underneath the housing using a bolt 48 and washer 50. In one embodiment, the cover plate 46 is zinc-plated, though other materials may be used, or in some embodiment, no plating is used. The cover plate 46 provides an area on which the bracket 38 (FIG. 1A) of the pivot arm 32 rests. In the depicted embodiment, the bracket assembly 42 comprises a substantially top planar surface 52 through which an opening of the housing 44 is formed to receive the electromagnetic device 40 and the cover plate 46 disposed over the electromagnetic device 40. The bracket assembly 42 further comprises a lip 54 that is angled upward relative to the planar surface 52. In one embodiment, the lip 54 is configured in a 45 degree angle, though not limited to that angle. The lip 54 facilitates or guides reception of the pivot arm 32 (e.g., the bracket 38 coupled to the pivot arm 32, FIG. 1A). In some embodiments, the lip 54 may be coplanar with the planar surface 52 (e.g., the angle omitted). In some embodiments, the bracket 38 may be of a different configuration to enhance or facilitate contact with the bracket assembly 42. The bracket assembly 42 further comprises another planar surface 56 that is mounted (e.g., via bolts, welds, rivets, etc.) to the sidewall of the trailer 12 (FIG. 1A) and that is orthogonal to the planar surface 52 that receives the pivot arm 32. The bracket assembly 42 may further comprise a brace or gusset 58 extending between a centered or lower-centered inner surface of the planar surface 56 and a centered or right-of-center location on the undersurface of the planar surface 52. Note that variations to the structure and/or material of the electromagnetic assembly 30 are contemplated, including additional and/or fewer components, different geometric configurations, etc., as would be appreciated by one having ordinary skill in the art in the context of the present disclosure.

Figure 3A:
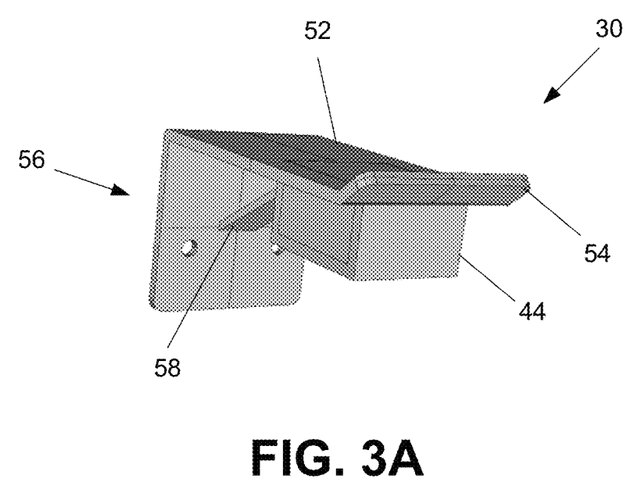
FIGS. 3A-3C are schematic diagrams that illustrate various perspective views of an embodiment of an example electromagnetic assembly.
Figure 3B:
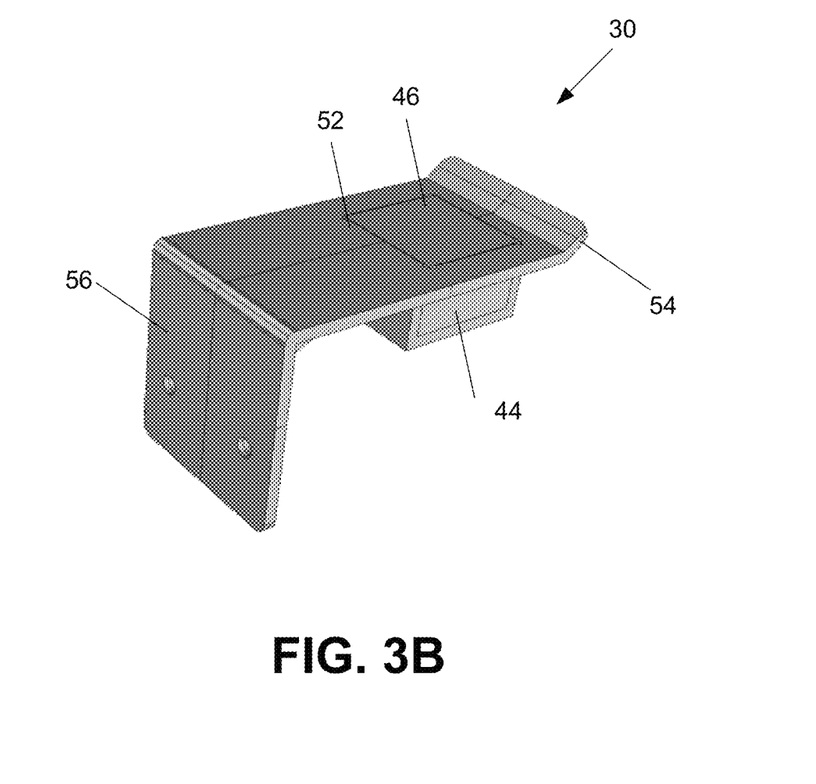
Figure 3C:
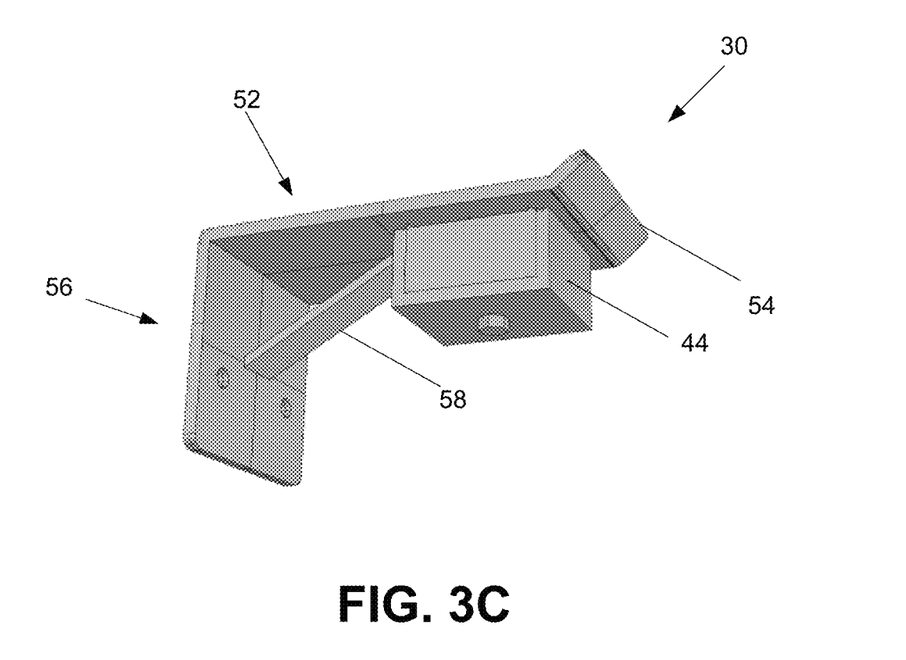

Referring to FIGS. 3A-3C, shown are schematic diagrams that illustrate various perspective views of an embodiment of an example electromagnetic assembly 30. As shown in FIGS. 3A-3C, the electromagnetic assembly 30 comprises an L-shaped configuration formed from the planar surfaces 52 and 56, the top planar surface 52 comprising an upended lip 54 used to guide receipt of the bracket 38 of the pivot arm 32 (FIG. 1A). The planar surface 56 is mounted to the sidewall of the trailer 12 (FIG. 1A), for instance in the upper rear portion of the trailer 12 to provide a suitable stopping point for the pivot arms 32 when the tarp 24 (FIG. 1A) is fully deployed. The electromagnetic assembly 30 further comprises the gusset 58, which adds structural support to the electromagnetic assembly 30. The electromagnetic assembly 30 further comprises a cubicle-shaped housing 44 that houses the electromagnetic device 40. Secured atop the housing 44 is the cover plate 46.

Figure 4A:
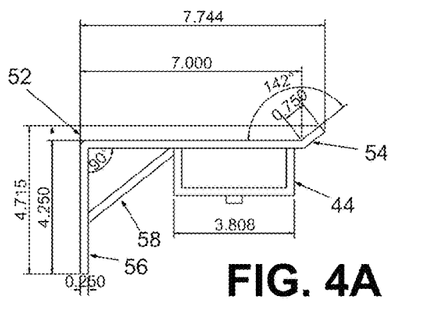
FIGS. 4A-4E are schematic diagrams that illustrate various views of the aluminum bracket/housing and corresponding metal contact plate and example dimensions for an embodiment of an example electromagnetic assembly.
Figure 4B:
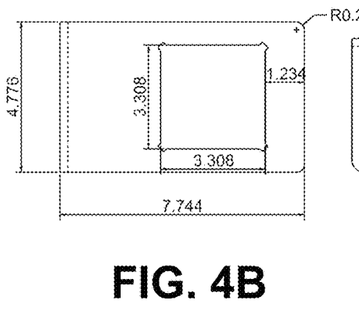
Figure 4C:
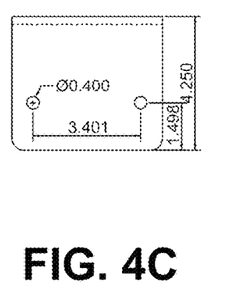
Figure 4D:
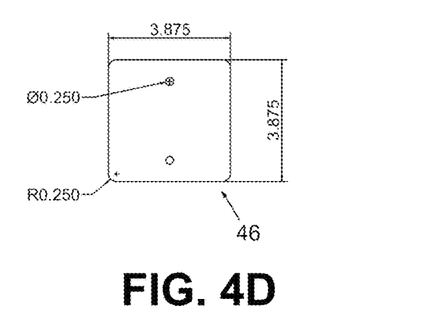
Figure 4E:
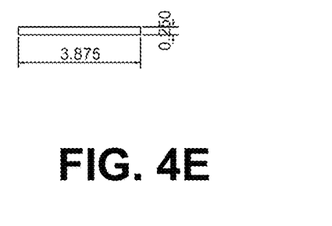

FIGS. 4A-4C are schematic diagrams that illustrate example, non-limiting dimensions for the bracket assembly 42 and housing 44, and FIGS. 4D-4E provide example, non-limiting dimensions for the cover plate 46. FIG. 4A is a side view of the bracket assembly 42, showing example dimensions for the planar surfaces 52 and 56, the lip 54, and the housing 44. FIG. 4B is a top view of the bracket assembly with example dimensions shown for the planar surface 52 and corresponding features, and FIG. 4C comprises a back view of the housing 44 with example dimensions. FIG. 4D and FIG. 4E are top and side views, respectively, of the metal cover plate 46 and example dimensions.

Figure 5A:
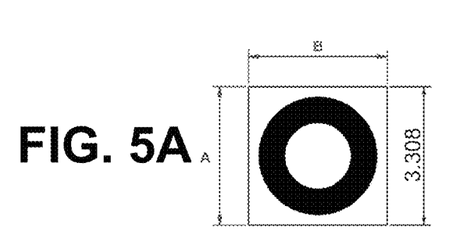
FIGS. 5A-5C are schematic diagrams of a top and side view and corresponding specification chart of example values for an embodiment of an example electromagnetic assembly.
Figure 5B:
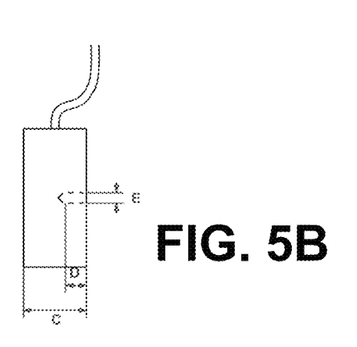
Figure 5C:
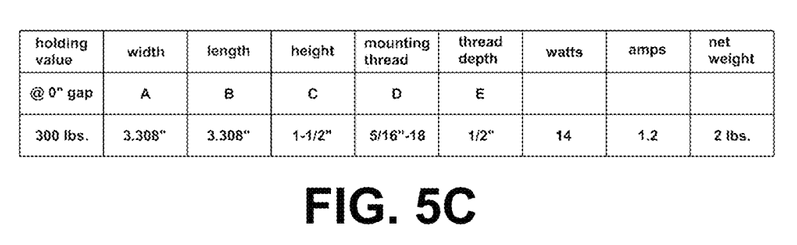

Referring now to FIGS. 5A-5B, shown are top and side views, respectively, of the electromagnetic device 40 (with the coil representatively shown), with FIG. 5C providing a chart of example, non-limiting specifications for the electromagnetic device 40. It should be appreciated by one having ordinary skill in the art, in the context of the present disclosure, that the example dimensions and/or specifications depicted in FIGS. 4A-5C are illustrative of one example embodiment, and that variations to the same may be used depending on the application, and hence such variations are contemplated to be within the scope of the disclosure.

Figure 6:
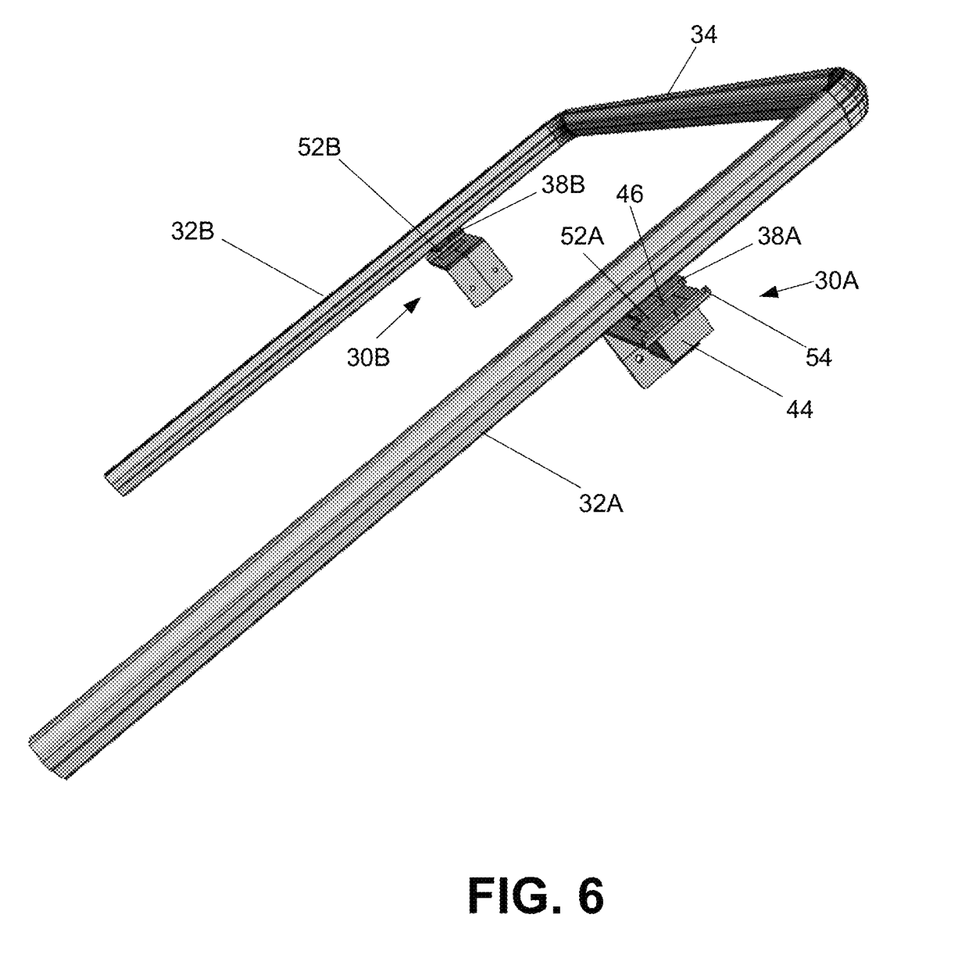
FIG. 6 is a schematic diagram that illustrates in partial, side isometric view, an embodiment of a pivot arm assembly comprising an example electromagnetic assembly in contact with a steel bracket for each of the pivot arms of the pivot arm assembly.

FIG. 6 is a schematic diagram that illustrates an embodiment of an example electromagnetic assembly 30 (e.g., 30A, 30B) in contact with the steel bracket 38 (e.g., 38A, 38B) for each of the pivot arms 32 (e.g., 32A, 32B). The bracket 38 is comprised in whole or in part of a ferromagnetic material (e.g., ¼ inch flat plate steel), and is of a substantially planar structure that is secured (e.g., screwed, bolted, welded, etc.) to the pivot arm 32. Referring in large part on the arm 32A and associated components (with the same or similar applicability to the components of or attached to the arm 32B), the bracket 38 rests on the top planar surface 52 of the electromagnetic assembly 30, its reception guided in one embodiment by the lip 54. The magnetic force generated by the electromagnetic device 40 (FIG. 2) located within the housing 44 and covered by the cover plate 46 provides for a secure coupling between the pivot arm 32 and the electromagnetic assembly 30 (e.g., approximately 300 lbs. of force for each electromagnetic device 40), which prevents or significantly mitigates the effects of the passage of wind underneath the tarp 24 (FIG. 1A) when the tarp 24 is in the covered position or configuration over the trailer 12 as the trailer 12 is hauled along a roadway.

Figure 7:
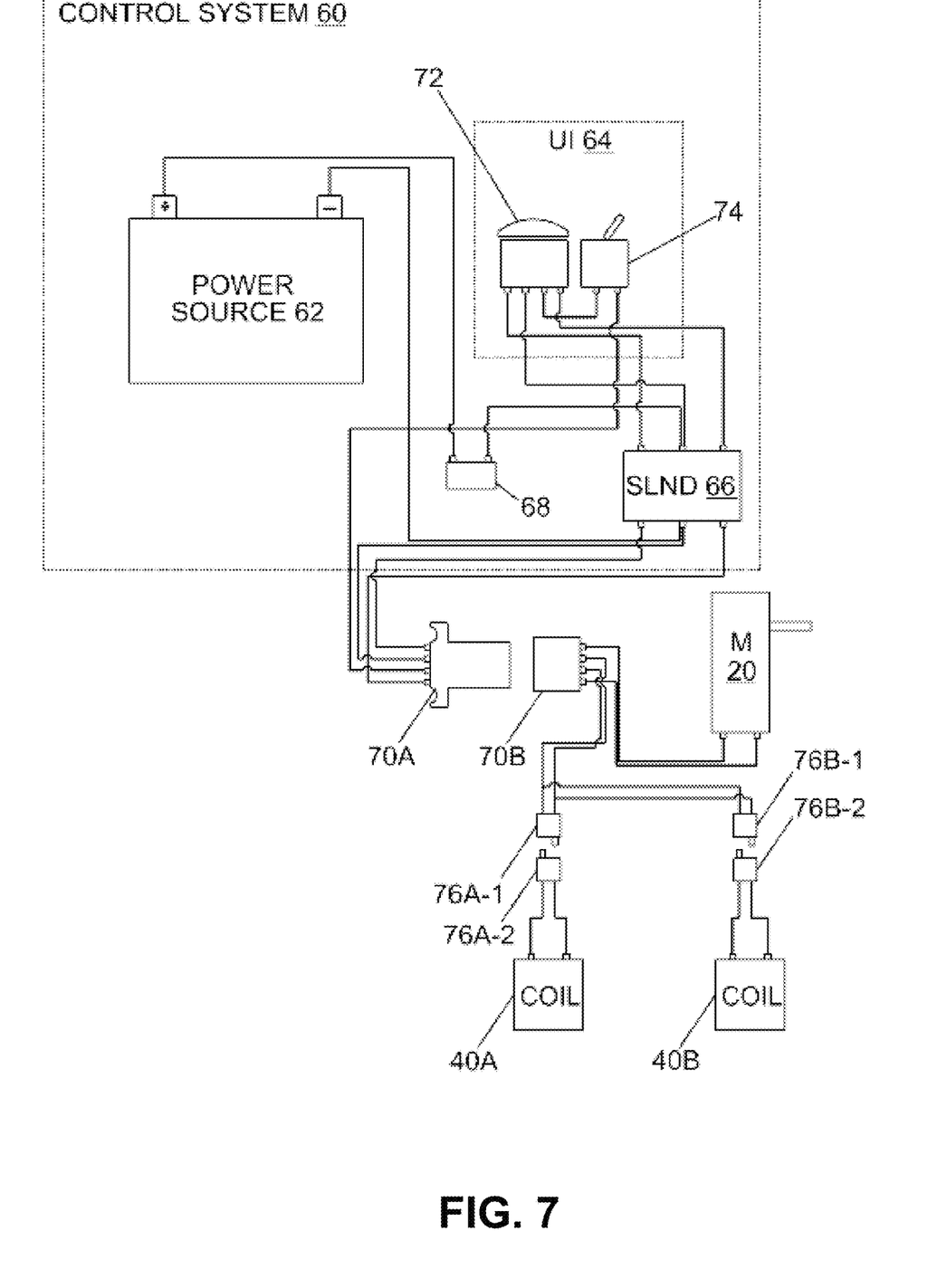
FIG. 7 is a schematic diagram that illustrates an embodiment of an example control system coupled to electromagnetic devices of an electromagnetic assembly.

FIG. 7 is a schematic diagram that illustrates an embodiment of an example control system 60 coupled to electromagnetic devices 40 (e.g., 40A, 40B) of the electromagnetic assembly 30 (FIG. 2) and the motor 20 of the motor assembly 18 (FIG. 1A). In one embodiment, the control system 60 comprises a power source 62, a user interface 64, and a solenoid 66 coupled together via wiring. The control system 60 may also include one or more circuit protection devices 68 (e.g., fuse(s), a breaker, etc.) and/or one or more connectors 70 (e.g., male, 4-prong plug 70A, female, 4-prong plug 70B). In one embodiment, the user interface 64 comprises a main rocker switch 72 and a kill switch 74. In one embodiment, the control system 60 is coupled to the magnetic devices 40 via the connectors 70 and a releasable connection (e.g., using plural connectors 76A-1, 76A-2 (2 prong plugs), 76B-1, 76B-2 (2-prong plugs). For instance, replacement of the magnetic devices 40 may be facilitated through the use of these connectors 76. In some embodiments, the connectors 76 may be omitted.

In one embodiment, the power source 62 comprises a common wet-cell, rechargeable battery (e.g., 12V, though other voltage levels may be used). For instance, a truck may house plural batteries, and the power source may be derived from one or more of these batteries. In some embodiments, other types of power sources may be used that are part of the tractor power supply or separate and independent from the tractor power supply.

The main rocker switch 72 is selected to engage and disengage the motor 20 and electromagnetic devices 40. The kill switch 74 provides a safety on/off switch (e.g., to cut off power from the power source 62) for the electromagnetic devices 40, and/or to prevent the energization of the electromagnetic devices 40 during periods of extended non-use. In one embodiment, the rocker switch 72 requires a sustained pressing action by the operator to provide a sustained activation of the motor 20 (and deactivation of the electromagnetic devices 40). For instance, to provide a continual rotation of the motor 20 (to cause rotation of the roll bar 22, FIG. 1A) to furl or unfurl the tarp 24, the operator presses down and maintains the pressure on the main rocker switch 72. The kill switch 74 may be a toggle switch or other type of switch. Similarly, the rocker switch 72 may be replaced with another type of switch in some embodiments. In general, in some embodiments, switches with a different action may be used in place of the switches 72 and 74, including soft buttons (e.g., presented on a graphical user interface) on a display screen (e.g., display screen of a computer monitor, dashboard display screen, portable communications device, etc.).

The circuit protection device 68 may, in one embodiment, be configured as an auto-reset overload breaker. In one embodiment, the circuit protection device 68 may be rated for 50 amperes, though other values may be used depending on the circuit implementation to protect against, for instance, overheating of the circuit components.

The solenoid 66 relays power, and reverses polarity, to the motor 20. The solenoid 66 is also arranged to send power to the electromagnetic devices 40.

The connectors 70 may be used to facilitate connections between the control system 60 and the components of the trailer 12 (FIG. 1A), particularly for instances where the truck is separate and independent of the trailer 12 (e.g., of separate chassis and coupled via a hitch assembly 16 (FIG. 1A)). The connectors 70 also provide another mechanism for inactivating the electromagnetic devices 40 (e.g., where there is no kill switch 74), although not as beneficial as the kill switch 74 given the need in the former to leave the cab 17 (FIG. 1A).

As explained in association with FIG. 1A, to operate the tarp hold-down system 10 (and assuming the tarp 24 is furled up in the motor assembly 18, FIG. 1A), in one embodiment, an operator in the cab 17 of the truck 15 (FIG. 1A) sustainably presses the main rocker switch 72, which switches on power to the solenoid 66, which in turn provides power according to a first polarity to the motor 20. The actuation of the motor 20 causes rotation of the roll bar 22 (FIG. 1A) coupled directly, or via an intervening mechanism (e.g., gears, clutch assembly, etc.), to a motor shaft. The rotation of the roll bar 22 facilitates the unfurling of the tarp 24 from the motor assembly 18 (FIG. 1A), based in one embodiment on the bias forces provided by the spring or springs of each pivot mount 28. Upon the pivot arms 32 (e.g., the brackets 38, FIG. 1A) coming in contact with the electromagnetic assembly 30, the operator releases the main rocker switch 72, which causes the solenoid 66 to remove the power to the motor 20 and relay power from the power source 62 to the electromagnetic devices 40. The electromagnetic device 40 provide a magnetic (attractive) force between the pivot arms 32 (FIG. 1A) and the electromagnetic devices 40, or more specifically, between each bracket 38 (FIG. 1A) of the pivot arms 32 and the electromagnetic assembly 30, which secures the tarp 24 in the covered position under a predetermined amount of force (e.g., approximately 300 lbs.).

To retract the tarp 24, the operator sustainably presses the main rocker switch 72, which causes power of a different polarity to be relayed by the solenoid 66 to the motor 20, causing the motor 20 to rotate in a reverse direction (e.g., reverse from the prior rotation action described above). The depression of the main rocker switch 72 also causes the solenoid 66 to deactivate or remove power to the electromagnetic devices 40, which removes the magnetic force and enables the pivot arms 32 to pivot away from the electromagnetic assemblies 30. The rotation of the motor 20, through coupling to the roll bar 22 as described above, causes a like rotation of the roll bar 22, which draws the tarp 24 back to the motor assembly 18 (FIG. 1A). When the tarp 24 has been retracted to the motor assembly 18, the operator releases the main rocker switch 72, which causes the solenoid 66 to deactivate the motor 20 and activate the electromagnetic devices 40. As explained above, should the operator wish to remove power to the electromagnetic devices 40 for an extended period of time, the operator may select the kill switch 74, which when activated, removes the power to the electromagnetic devices 40.

As explained above, variations to the control system 60 are contemplated and hence within the scope of the disclosure. For instance, all or a portion of the control system 60 may be replaced or supplemented with a computer, programmable logic controller (PLC), electronic control unit (ECU), packaged logic (e.g., using application specific integrated circuits or ASICS, field programmable gate arrays (FPGAs)), discrete logic, analog, digital, or a combination of analog and digital circuitry, or other circuitry (e.g., with different switches, the addition of sensors, limit switches, alarms, sound devices, etc.).

Figure 8:
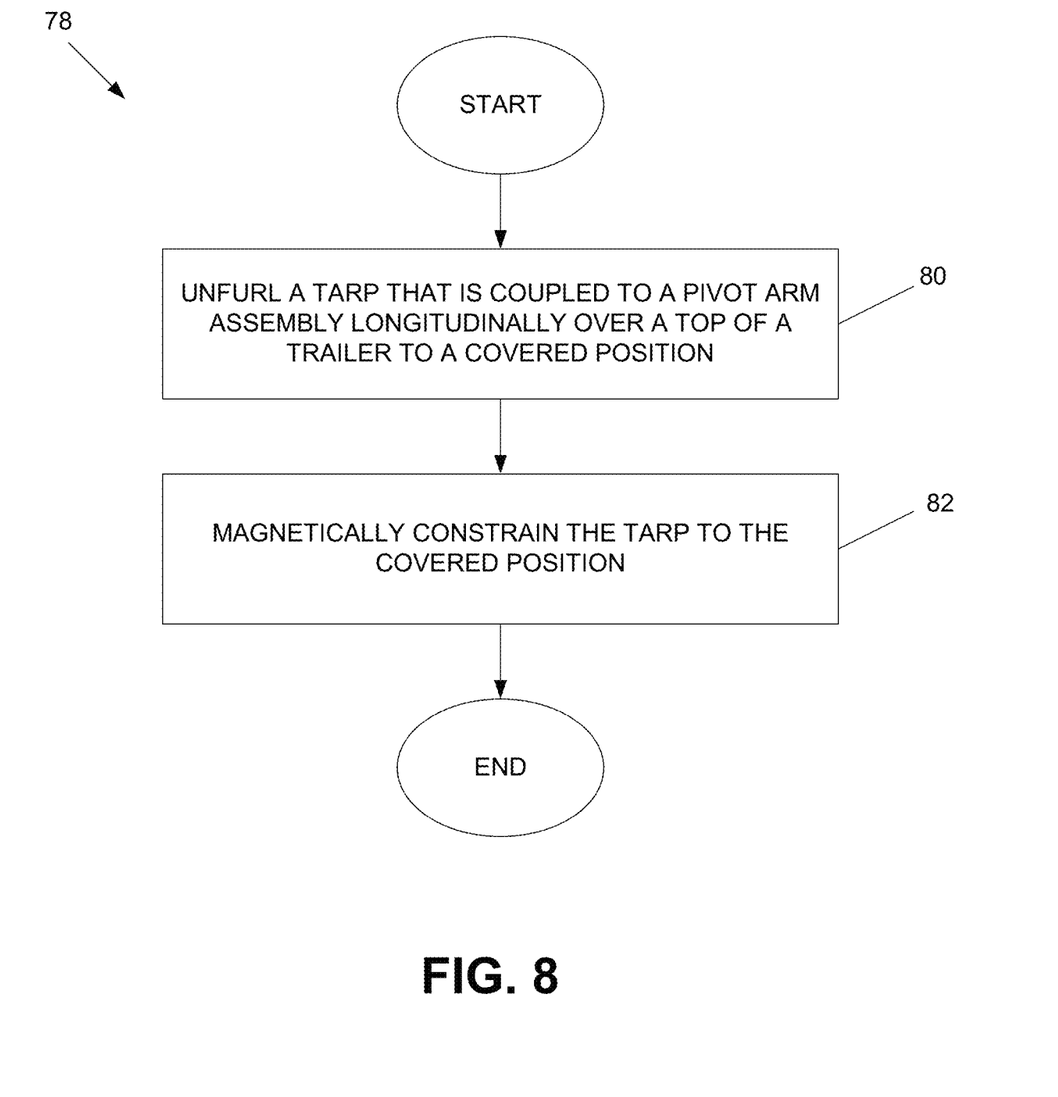
FIG. 8 is a flow diagram that illustrates an embodiment of an example tarp hold-down method.

Having described certain embodiments of a tarp hold-down system 10, it should be appreciated that one embodiment of a tarp hold-down method, described in association with FIG. 8 and denoted as method 78, comprises unfurling a tarp that is coupled to a pivot arm assembly longitudinally over a top of a trailer to a covered position (80); and magnetically constraining the tarp to the covered position (82).

Any process descriptions or blocks in flow diagrams should be understood as representing automated logic and/or steps in a process, and alternate implementations are included within the scope of the embodiments in which functions may be executed out of order from that shown or discussed, including substantially concurrently, or with additional steps (or fewer steps), depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A system, comprising:
a trailer comprising a chassis and plural wheels operably coupled to the chassis;
a motor assembly mounted proximal to a front portion of the trailer;
a pivot arm assembly mounted to the trailer, the pivot arm assembly comprising plural arms joined by a transverse arm extending over the trailer, each of the pivot arms pivotable about a pivot mount;
a tarp coupled to the transverse arm and to the motor assembly; and
plural electromagnetic assemblies, each comprising an electromagnetic device, mounted to each side of the trailer,
wherein the motor assembly is configured to cause motion of the tarp over the trailer, and when the tarp is unfurled longitudinally over a top of the trailer in a covered position, each electromagnetic device of the plural electromagnetic assemblies is configured to magnetically constrain the tarp in the covered position.

2. The system of claim 1, wherein the plural arms are spring biased according to one or plural springs.

3. The system of claim 1, wherein the motor assembly is mounted to the trailer.

4. The system of claim 1, wherein the motor assembly comprises a motor and a roll bar operably coupled to the motor and to which the tarp is coupled, the motor configured to cause rotation of the roll bar to retract or facilitate an unfurling of the tarp.

5. The system of claim 1, wherein each of the electromagnetic assemblies further comprises a bracket assembly, the bracket assembly housing the electromagnetic device and affixed to a sidewall of the trailer at a location proximal to an upper rear end of the trailer, the bracket assembly further comprising a cover plate located over the electromagnetic device.

6. The system of claim 5, wherein each of the plural arms comprises a bracket that is arranged in a location suitable to contact the cover plate of the respective bracket assembly when the tarp is in the covered position.

7. The system of claim 6, wherein the bracket comprise ferromagnetic properties.

8. The system of claim 6, wherein the electromagnetic device is selectively activated.

9. The system of claim 1, further comprising a control system, the control system configured to selectively activate the motor and the electromagnetic devices.

10. The system of claim 9, wherein the control system is configured to deactivate the electromagnetic devices when the motor is activated, and activate the electromagnetic devices when the motor is deactivated.

11. The system of claim 9, wherein the control system comprises a user interface, wherein based on user input to the user interface, the control system is configured to deactivate the electromagnetic devices when the tarp is in the covered position or in a fully retracted position.

12. The system of claim 11, further comprising a cab coupled to the trailer, wherein the user interface is located in the cab.

13. A method, comprising:
unfurling a tarp that is coupled to a pivot arm assembly longitudinally over a top of a trailer to a covered position; and
magnetically constraining the tarp to the covered position, wherein magnetically constraining comprises activating an electromagnetic device located on each side of the trailer when the pivot arm assembly and a bracket assembly housing the electromagnetic device are in contact with each other.

14. The method of claim 13, wherein unfurling the tarp comprises enabling a transverse arm of the pivot arm assembly to be moved rearward, the transverse arm coupled to the tarp.

15. A system, comprising:
a control system;
a pivot arm assembly, the pivot arm assembly comprising plural arms joined by a transverse arm; and
plural electromagnetic assemblies, each comprising an electromagnetic device,
wherein the control system is configured to selectively activate each electromagnetic device when the plural arms are in contact with the plural electromagnetic assemblies to magnetically constrain movement of the plural arms relative to the plural electromagnetic assemblies.

16. The system of claim 15, wherein the control system is configured to deactivate each electromagnetic device to enable the plural arms to pivot away from the plural electromagnetic assemblies.

17. The system of claim 16, further comprising a motor assembly comprising a motor and a roll bar, the roll bar coupled to the transverse arm via a tarp coupled to the roll bar and the transverse arm, wherein the control system is configured to cause the plural arms to pivot away from the plural electromagnetic assemblies by activating the motor to retract the tarp to the motor assembly.

18. The system of claim 15, wherein the control system comprises a user interface, wherein based on user input to the user interface, the control system is configured to deactivate and activate each electromagnetic device.

19. The system of claim 18, wherein the user interface comprises plural switches.

\* \* \* \* \*